United States Patent [19]

Chmielewski, Jr. et al.

[11] Patent Number: 5,243,690
[45] Date of Patent: Sep. 7, 1993

[54] ROBOT TARGETING USING TRANSIT TIME CONTROL

[75] Inventors: Thomas A. Chmielewski, Jr., Southampton Township, Bucks County, Pa.; Brian R. Frederick, Pennsauken; Constantine J. Tsikos, Voorhees Township, Camden County, both of N.J.

[73] Assignee: General Electric Company, Moorestown, N.J.

[21] Appl. No.: 435,895

[22] Filed: Nov. 14, 1989

[51] Int. Cl.⁵ .................. G06F 15/20; G06F 15/46
[52] U.S. Cl. .................. 395/97; 395/904; 901/7; 901/20
[58] Field of Search ............ 364/513, 474.26, 474.29, 364/474.31, 474.34, 478, 569, 513; 901/7, 20; 395/97, 904

[56] References Cited

U.S. PATENT DOCUMENTS

| | | | |
|---|---|---|---|
| 4,338,672 | 7/1982 | Perzley et al. | 395/84 |
| 4,612,487 | 9/1986 | Shimomura | 395/86 |
| 4,685,054 | 8/1987 | Manninen et al. | 364/189 |
| 4,692,876 | 9/1987 | Tenma et al. | 395/84 |
| 4,698,777 | 10/1987 | Toyoda et al. | 395/87 |
| 4,706,204 | 11/1987 | Hattori | 364/474.31 |
| 4,754,392 | 6/1988 | Nakashima et al. | 395/80 |
| 4,794,513 | 12/1988 | Müller | 395/80 |
| 4,821,207 | 4/1989 | Ming et al. | 395/87 |
| 4,835,710 | 5/1989 | Schnelle et al. | 395/86 |

Primary Examiner—Michael R. Fleming
Assistant Examiner—George Davis
Attorney, Agent, or Firm—W. H. Meise; S. A. Young

[57] ABSTRACT

A robot is controlled to move from a predetermined rest point to contact a moving target. The control parameters of the robot are not known. Control is effectuated by predetermining the time required for the robot to move from a rest position to each of a plurality of points within the region in which the target is expected to be found. When the target is identified, its location near the predetermined points at a future time is computed. The known time required from motion of the robot from the rest position to predetermined points adjacent the future location of the target is determined by reference to stored information. The exact time required for the motion may be interpolated between the predetermined points. The time for robot motion is subtracted from the future time to determine the time at which robot motion begins. In a particular embodiment of the invention, a robot coacts with a circular conveyor belt to retrieve objects from the conveyor and transport them to a dump point.

13 Claims, 6 Drawing Sheets

ROBOT TARGETING USING TRANSIT TIME CONTROL

The government has rights in this invention pursuant to contract 104230-84-D-0920 with the United States Postal Service.

This invention relates to an arrangement for control of a robot given only information relating to the time required for the robot to travel between a rest and a predetermined grid position, and more particularly, for control of such a robot for targeting, such as for causing the robot to acquire unsingulated objects or mail pieces on a moving conveyor for grasping or the like.

BACKGROUND OF THE INVENTION

Robots are widely used in industry for tasks such as welding and painting. In such tasks, the robot gripper is attached to a tool, and the robot is controlled to apply the tool to, or manipulate the tool near a stationary workpiece. The task of causing the robot tool point to intersect an identified point (such as a corner or the centroid) on an object is known as "targeting". A more complex task which may be performed by robots is to acquire parts on a moving conveyor belt. Such tasks may be found in industry for inspection and sorting, and in mail carrier applications for singulation of unsingulated mailpieces. Upon completion of "targeting", the robot may pick up the object with a gripper such as a vacuum cup or "sticky tape", or it may apply a dot of paint or ink to the surface of the object to identify parts in an automated inspection system.

If static and dynamic information and equations characterizing the robot's motion were available from the manufacturer, a user could generate software for identifying the location of the target and for directing the various motors and controls in such a fashion as to cause the robot to acquire the target. However, such information is ordinarily not available from the robot manufacturer.

Commercial software is available which provides the capability of interfacing specific robots and vision systems with linear belt conveyors. One example of such a software package is "Conveyor Tracking (moving line)", manufactured by Adept, whose address is 1212 Bordeaux Drive, Sunnyvale, Calif. 94089. This software package is included with their V+ language and is adapted to couple an Adept robot to a linear conveyor provided with a speed indicator, and optionally to a vision system. Operation of such software commonly causes the gripper velocity to be matched to that of the conveyor, physically tracking the item to be grasped (the "target") with the gripper (or other tool) at a location above the target. When tracking is achieved, the gripper or tool is lowered, still tracking the target. The robot then gasps and removes the part or performs a tool function, as appropriate.

Such commercial software provides the desired function, but is specific to a particular robot and vision system, and limited to linear conveyors. In general, such commercial software tends to be robot and conveyor specific, and the quantities of the software packages which are sold tends to be small, and therefore the cost of software generation must be spread over only few units, so the unit cost tends to be high. The cycle time for acquisition tends to be higher than desirable because of the need for tracking of the workpiece before acquisition. Improved robot control is desired.

SUMMARY OF THE INVENTION

A method of controlling a robot for causing it to acquire a moving target includes the preliminary step of operating the robot between a rest position and a plurality of grid points associated with the acquisition area of the robot. The time required for the robot to move from the rest position to each grid point is stored in memory. During operation, the velocity (speed and direction) of the target is determined. The direction may be predetermined by the shape of a conveyor. The location of the target is determined at a particular moment, and its position is calculated at a future time within the robot's acquisition area. The time required for the robot to move from the rest position to the grid point nearest the future location of the target is retrieved from memory. If the future location of a target is not precisely at a grid point, the time required for the robot to travel between the rest position and the future position of the target may be interpolated from information relating to grid points near the future location. The time for initiation of the robot's motion from the rest position toward the tarqeted point, i.e. the future position of the object, is obtained by subtracting the robot's transit time (between the rest position and the target point) from the future time at which the object will be at the target point.

DESCRIPTION OF THE INVENTION

Figure 1:
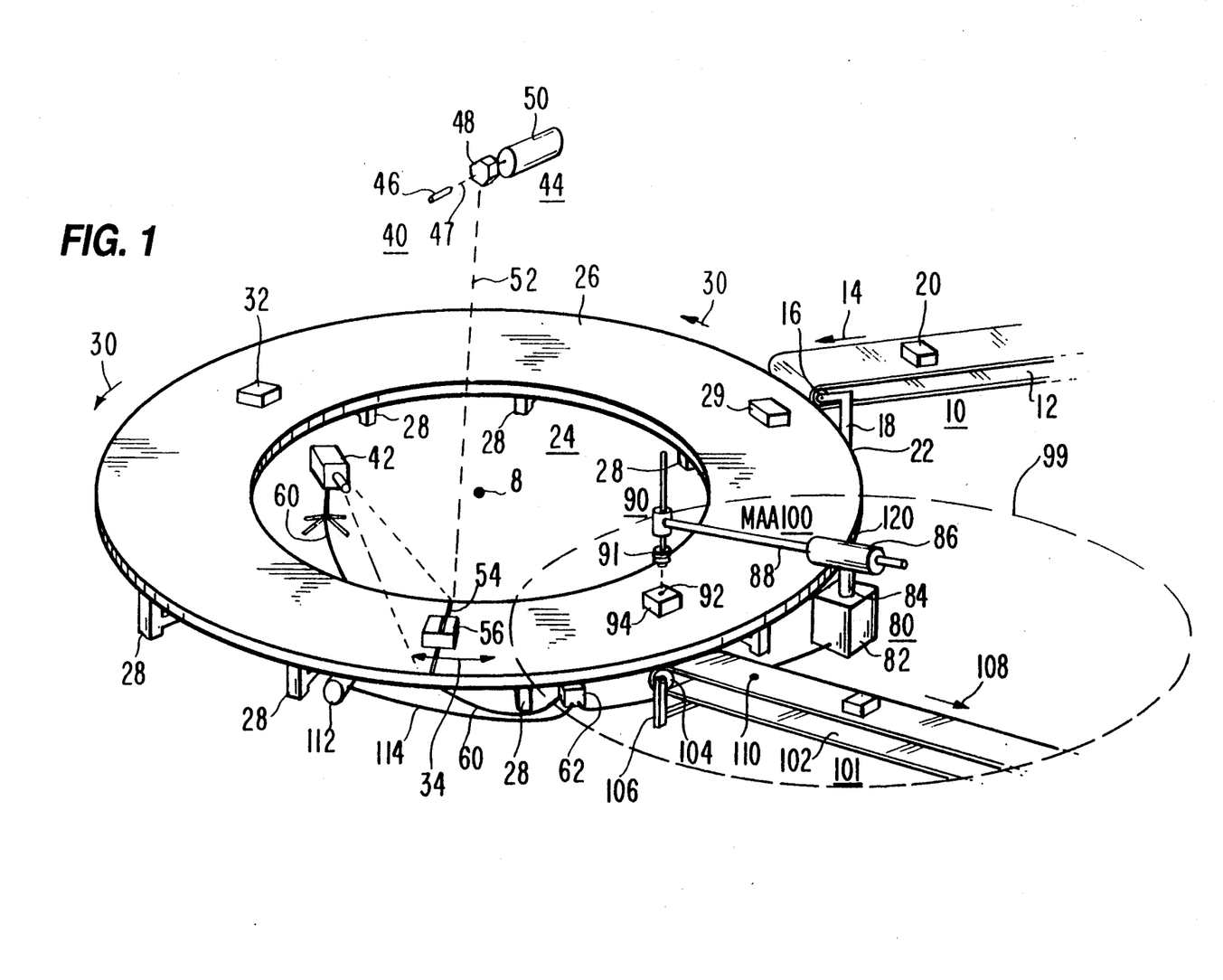
FIG. 1 is a perspective or isometric view of a simplified mailpiece singulating station including a feed conveyor, a circular conveyor, and an exit conveyor, a vision system and a robot controlled in accordance with the invention.

In FIG. 1, a feed conveyor designated generally as 10 includes a continuous belt 12, the upper portion of which moves in the direction of arrow 14, and over a roller 16 supported by legs, one of which is illustrated as 18. A mailpiece illustrated as 20 is illustrated as moving toward the near end of conveyor 10. The term "mailpiece" is a general term which may be applied to packages, magazines, letters, "flimsies" or computer bills, post cards, and the like which may from time to time be handled by a postal carrier.

The near end of conveyor 10 is located over the outer edge 22 of a circular conveying arrangement or conveyor designated generally as 24 centered on a center point 8. Conveyor 24 includes a circular "belt" 26, which as known in the art may actually be made up of a number of articulated segments. Conveyor 24 is supported on a plurality of legs 28, at a height such that mailpieces such as 20 which may fall from the end of feed conveyor 10 land on belt 26. A mailpiece 29 is illustrated as having just fallen onto conveyor belt 26.

Conveyor belt 26 moves in the direction of arrows 30, under the control of a motor (not illustrated). Motion of conveyor belt 26 causes mailpieces entering or being dumped from feed conveyor 10 to move about the conveyor, successively assuming positions such as the illustrated position of mailpiece 32. At some point during conveyance by conveyor 24, each mailpiece enters the viewing area 34 of a vision system designated generally as 40, which includes a television camera 42 which views viewing region 34, and also includes a light stripe generator 44 with a projection laser 46 which projects a beam 47 of laser light onto a polygonal reflecting wheel 48 rotated by a motor 50. Reflecting wheel 48 causes laser beam 47 to be reflected as a scanned beam 52. Beam 52 scans laterally or radially across the upper surface of conveyor belt 26 and causes a light stripe illustrated as 54 across the conveyor belt and any mailpieces, such as package 56, which happen to lie thereunder.

The arrangement of television camera 42 and light stripe generator 44 interconnected, as by cables 60, with a computing system 62 including vision system software (not illustrated), can determine the presence and dimensions of mailpieces on conveyor 26. From this information, it is relatively easy to determine the location of the centroid of a mailpiece. The location of the centroid of the mailpiece may be of interest when the package is picked up. The vision system is conventional. Ideally, the vision system should be of the type providing information in three dimensions, so the amount of vertical motion required by the robot may be determined.

The arrangement of FIG. 1 also includes a robot designated generally as 80, including a base 82, a support shaft 84 rotatable about a vertical axis 120, supporting a linear bearing and drive arrangement 86, and an arm 88 terminated in a gripper support arrangement 90 and gripper 91. As illustrated in FIG. 1, gripper 91 is poised over the centroid 92 of a mailpiece 94, ready for pickup. A unilateral gripper such as a vacuum cup may be advantageous if the targeting point is slightly in error, or if there is residual motion. The range of gripper 91 extends over an arm access area encompassed within a dotted outline 99, which represents a circle centered on axis 120 of rotatable support shaft 84. Gripper 91 can reach objects of various heights which are on conveyor belt 26 and which lie within arm access area 99. Within the area access area, the material acquisition area (MAA) 100 lies within that portion of the surface of conveyor belt 26 lying within arm access area 99, as described in more detail below.

An exit conveyor designated generally as 101 includes an endless belt 102 which is guided by a roller 104 supported by legs, one of which is illustrated as 106. The upper portion of belt 102 moves in the direction of an arrow 108, for carrying away singulated mailpieces placed thereupon by robot 80.

In accordance with an aspect of the invention, robot 80 places ("dumps") the singulated mailpieces at a particular location on exit conveyor 100. This particular location is termed the "dump point" or "rest position" of the robot, and is illustrated in FIG. 1 as the point 110. As described below, dump point 110 (or more appropriately, the position of robot 80 at which gripper 91 is over point 110) is selected reasonably near outer edge 22 of conveyor 24 to minimize the time required for transit of the robot gripper to grid points (described below) within the MAA.

In order to determine the speed of a mailpiece moving along conveyor belt 26, a speed transducer illustrated as 112 produces speed-representative signals on a conductor or data path 114, which signals are coupled to computer 62 for use in conjunction with software according to the invention (described below). Speed transducer 112 may be associated with conveyor drive means such as a drive motor or transmission (not illustrated), as desired.

Figure 2:
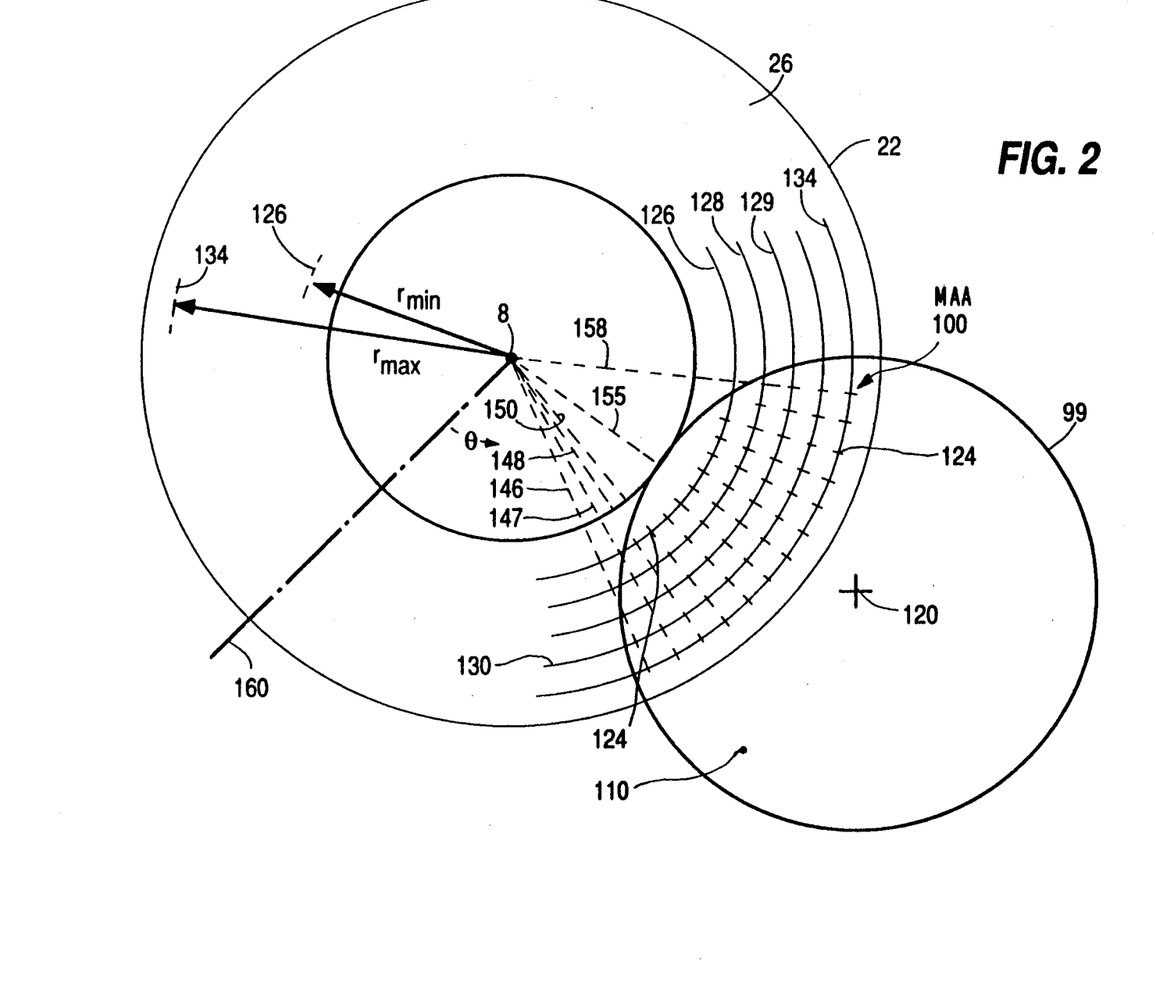
FIG. 2 is a plan view of a portion of the arrangement of FIG. 1, illustrating grid points of a radial coordinate system within the material acquisition area (MAA) of the robot.

FIG. 2 is a plan view of the upper surface of conveyor belt 26 of FIG. 1, overlaid by circle 99 representing the maximum range of gripper 91 and defining the arm access area of robot 80. Circle 99 is centered on axis 120, which is seen end-on. The MAA 100 lies within circle 99. Within the MAA 100, which is essentially the surface of conveyor belt 26 lying within circle 99, a set of grid points are constructed, some of which are designated 124. Grid points 124 occur at the intersections of equally-spaced circumferential lines such as 126, 128, 130 . . . 134, which are centered on center point 8 of conveyor 24, with radial lines such as 146, 148, 150 . . . 155 . . . 158. Radial lines 146–158 are angularly spaced by equal incremental angles $\theta$. The angular spacing between adjacent grid points 124 is selected small enough so that a rounded-off angle $\theta$ lying within the MAA defines the angle at which a grid point occurs, as described in more detail below. A radial 155 extends from center 8 to axis 120. The actual MAA is smaller than the surface of conveyor 26, for objects cannot actually be placed on the edge of the conveyor, for they may fall off. Thus, the MAA does not extend to the edge of the conveyor. For a conveyor with an inside radius of 715 mm and an outer radius of about 1218 mm, the edges of the MAA may be 60 mm from the inner and outer edges of the conveyor.

Figure 3:
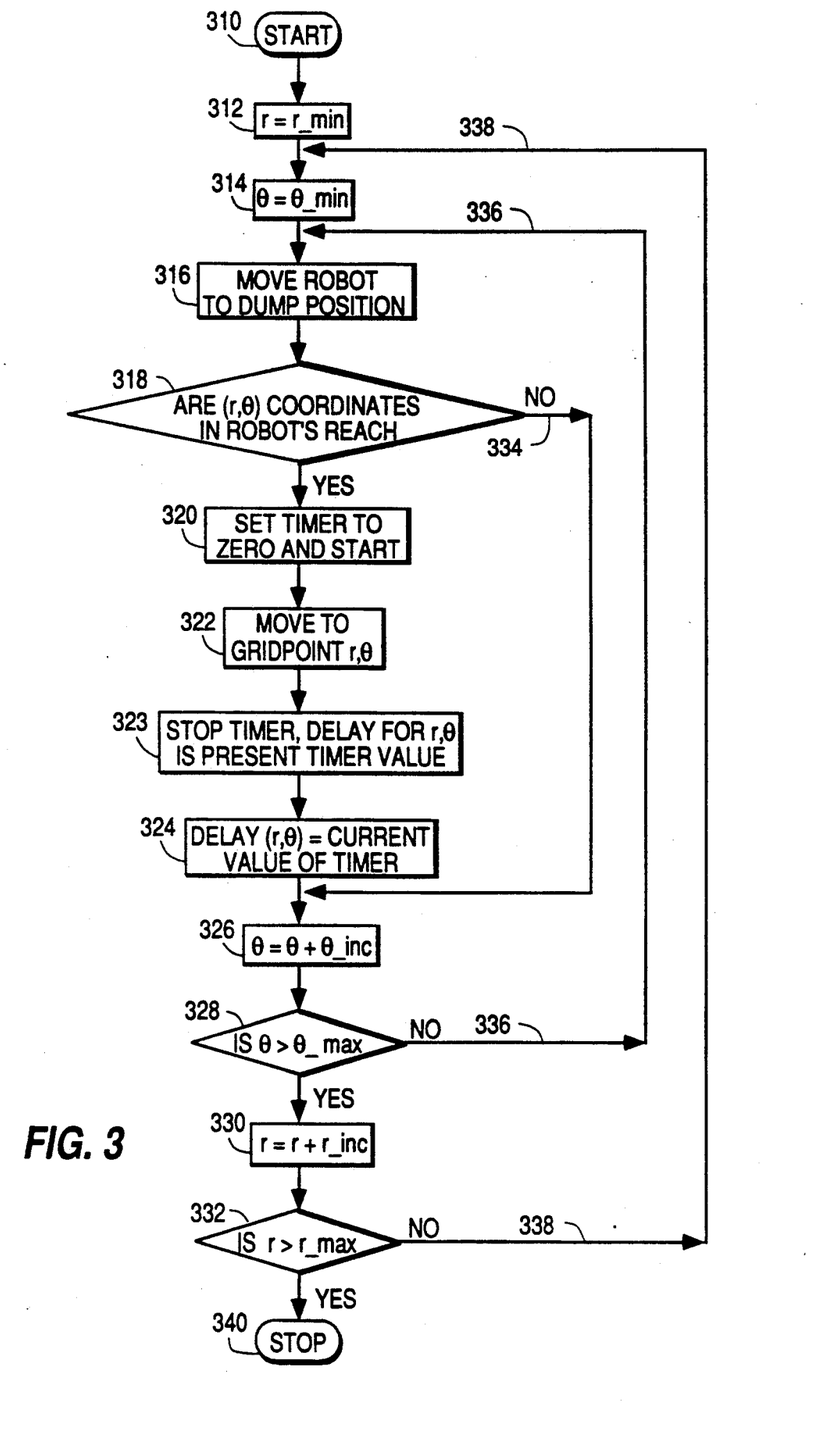
FIG. 3 is a simplified flow chart illustrating the procedure for loading a memory with data relating to the time required for robot motion between a rest position and each of a plurality of grid points.

FIG. 3 illustrates as a flow chart the steps required for loading a memory with information relating to the time required for the gripper to move from rest position 110 to each grid point. This may be performed once, with the information thereafter being stored in nonvolatile memory. However, since the robot parameters may change over time, due to temperature, wear, lubrication condition, power line voltage and the like, it may be desirable to perform the measurement daily at turn-on, or at the beginning of each shift, or the like. Alternatively, the set-up may be performed automatically at preset times, or a few grid points at a time may be updated automatically during intervals when the conveyor is lightly loaded, as identified by the computer in conjunction with the vision system.

In general, the flow chart of FIG. 3 represents the setting of the robot to the rest position, testing to see if the robot arm can reach a selected grid point 124 of FIG. 2, and starting a timer simultaneous with starting of motion of the robot arm toward the grid points. The elapsed time at the moment the arm reaches the specified grid point is stored in memory at an address identified by the radius r and the angle $\theta$ of the particular grid point, and the robot arm is returned to the rest position in readiness for accessing the next grid point. The grid points are accessed in sequence, beginning with the grid point at $r_{min}$ and $\theta_{min}$, corresponding to the minimum radius (distance from center 8 to circumferential line 126 of FIG. 2) and the minimum angle measured from some arbitrary radial reference line such as line 160 of FIG. 2. The first grid point might therefore be at the intersection of radial 146 of FIG. 2 with circumferential line 126. The test of whether the robot arm can reach this grid point would fail, so the system increments by $\theta_{inc}$ (the incremental angle between adjacent radial lines) to the grid point at the intersection of radial line 147 and circumferential line 126. The "reaching" test again fails, so the system increments to the intersection of radial 148 with circumferential line 126, which the robot can reach. The robot is reset to rest position 110, and the timer is started when the robot arm begins movement. The system then stores the transit time data, and moves on to test the grid point at the next radial line 150 and circumferential line 126. When all grid points lying on circumferential line 126 have been tested, the system increments by $r_{inc}$ (the radial distance between adjacent circumferential lines) to begin testing grid points lying on circumferential line 128, beginning with the one at the intersection with radial line 146. In this fashion, all grid points are tested in sequence.

In the flow chart of FIG. 3, testing begins with a START order represented as 310. The value of variable r is set to $r_{min}$ in a logic block 312. The logic flows to a block 314, which represents the setting of variable $\theta$ to $\theta_{min}$. Block 316 represents the command to move the robot arm to the rest or DUMP position. Decision block 318 makes the decision as to whether the robot arm can reach the current $r,\theta$ coordinates. This may be accomplished by addressing a preprogrammed memory which includes this information, or by a subroutine (not illustrated) which commands arm motion toward the $r,\theta$ target coordinates and which tests after a sufficient time to see if the coordinates have been reached. If the result is NO, the test of the grid point in question is bypassed by logic flow over path 334 to logic block 326.

If the result of decision block 318 is YES, the logic flows to block 320, representing resetting of a timer (not illustrated) to zero and then starting the timer. Block 322 commands motion of the robot arm toward the current value of $r,\theta$. Control will not pass from this block until the robot has reached the commanded position. Block 323 represents stopping of the timer and block 324 represents writing of the timer value into memory at address $r,\theta$.

Block 326 is reached after the time test of a grid point (from block 324) or by inability to reach the grid point (from path 334). Block 326 represents the incrementing of $\theta$ by the incremental value $\theta_{inc}$. Decision block 328 tests the current value of $\theta$ to determine whether $\theta_{max}$, the maximum angle of $\theta$, has been exceeded. The maximum value of $\theta$ corresponds to radial line 158 of FIG. 2. If $\theta$ is less than $\theta_{max}$, the logic exits decision block 328 by the NO output, and proceeds by logic path 336 back to block 316. The test is then performed again, still at $r_{min}$, but at an incremental $\theta$. The logic continues to loop, returning to block 316, until $\theta_{max}$ is exceeded, at which time the logic flows from decision block 328 by way of the YES output. From decision block 328, the logic flows to a block 330 which represents the increment of the value of r to $r+r_{inc}$. Decision block 332 tests whether the incremented value of r exceeds $r_{max}$, and so long as it does not, allows testing to continue by exiting block 332 by the NO output and looping back to block 314 by way of logic path 338. After each loop back to block 314, the current value of variable $\theta$ is set back to $\theta_{min}$, so that the logic loop including loop back path 336 tests all values of $\theta$ at the current value of r. After the final test, block 330 will increment r to a value exceeding $r_{max}$, and decision block 332 will cause the logic to flow by the YES output to STOP block 340. This completes the loading of the memory with transit time information.

In use of the vision system and robot for sorting of mailpieces, some time must be provided for the vision system to perform the location calculations and the centroid calculations for the object to be manipulated. After a time established by worst-case requirements for computing, the location-determining program produces a set of data $(r_m, \theta_m)$ representing the location of the mailpiece centroid radially as measured from center 8, and circumferentially measured from a reference radial such as 160 of FIG. 2. The radius $r_m$ is a constant, since the radial position of the mailpiece on the conveyor should not change, while $\theta_m$ is a time-varying quantity. Since the instantaneous velocity of the conveyor is known, the $\theta$ coordinate at any desired future time can be calculated, or the time at which the mailpiece will reach a particular value of $\theta$ can be calculated.

Figure 4:
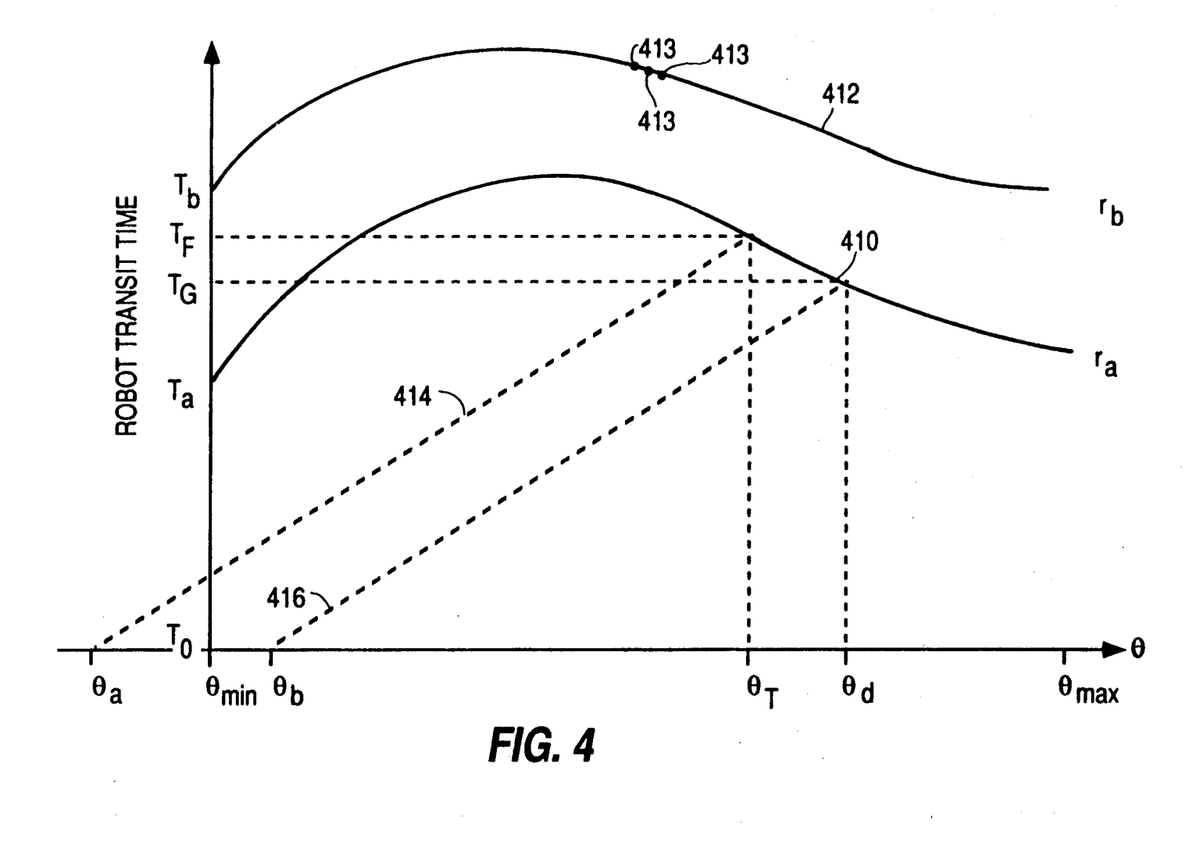
FIG. 4 is a plot illustrating the data produced by the method of FIG. 3.

FIG. 4 illustrates plots 410 and 412 of empirically derived data relating to the robot's transit time between the rest position and points at radii $r_a$ and $r_b$, respectively, where radius $r_a$ is closer to the rest position than radius $r_b$. These plots are selected for illustrative purposes from a family of similar plots. Plots 410 and 412 are continuous, and connect the discrete data points associated with the discrete grid points 124 discussed above in relation to FIG. 2. Three such data points are illustrated as 413 in FIG. 4. Plot 410 may be understood by considering that a finite time $T_a$ is required for the robot to accelerate from the rest position (110 of FIG. 2) and to move to the nearest grid point ($\theta_{min}, r_a$ of FIG. 2). A time greater than $T_a$ is required for the arm to move from rest to grid points at $r_a$ but at $\theta$ greater than $\theta_{min}$, but for grid points at $r_{max}$ and near $\theta_{max}$, it takes only slightly longer than the minimum time, due to the kinematics of the robot. Plot 412 represents the time required for the robot to move to grid points at a radius $r_b$, more distant from the rest point than $r_a$, so the transit takes more time, the minimum time being $T_b$.

An object or mailpiece sitting on circular conveyor belt 26 moves with a constant angular velocity, and at a constant radius r. For any such object, only one curve of the family of curves of FIG. 4 is relevant, namely that curve corresponding to the radius at which the mailpiece is located. For purposes of illustration, assume that a mailpiece on conveyor belt 26 is at (has its centroid at) radius $r_a$, corresponding to curve 410 of FIG. 4. The vision system may identify the mailpiece for targeting at any position on the conveyor, either within or without MAA 100 (FIG. 2). As illustrated in FIG. 4 at time $T_o$, the mailpiece is identified by the vision system at an arbitrary position $\theta_a$, before $\theta_{min}$, i.e. outside the MAA. Since the speed of the conveyor is assumed to be constant, the angular position of the mailpiece changes linearly with increasing time, following a dotted path such as 414, the slope of which depends upon the conveyor's speed. It should be noted that the conveyor speed need not be constant for purposes of the invention, but it makes the calculations of position easier to implement. Remembering that the mailpiece is assumed to be at a radius of $r_a$ in this example, only the intersection of path 414 with curve 410 is relevant.

The intersection occurs at the angle $\theta_T$. Thus, the grid point of the future location can be calculated to be $r_a, \theta_T$. By reference to the memorized transit time information, the robot's transit time is $T_F$. Therefore, at a time $T_F$ before the mailpiece reaches angle $\theta_T$, the robot's motion from the rest position toward grid point $r_{max}$, $\theta_r$) is initiated. If the mailpiece is identified by the vision system for targeting at an angle $\theta_b$, which lies within the MAA (line 416), the intersection with curve 410 occurs at an angle $\theta_d$, which requires a different robot access time than $T_F$. In this particular example, once the solution is found the robot is immediately commanded to move since both it and the mailpiece will arrive at $r_a$, $\theta_d$ in time $T_G$ seconds.

Figure 5:
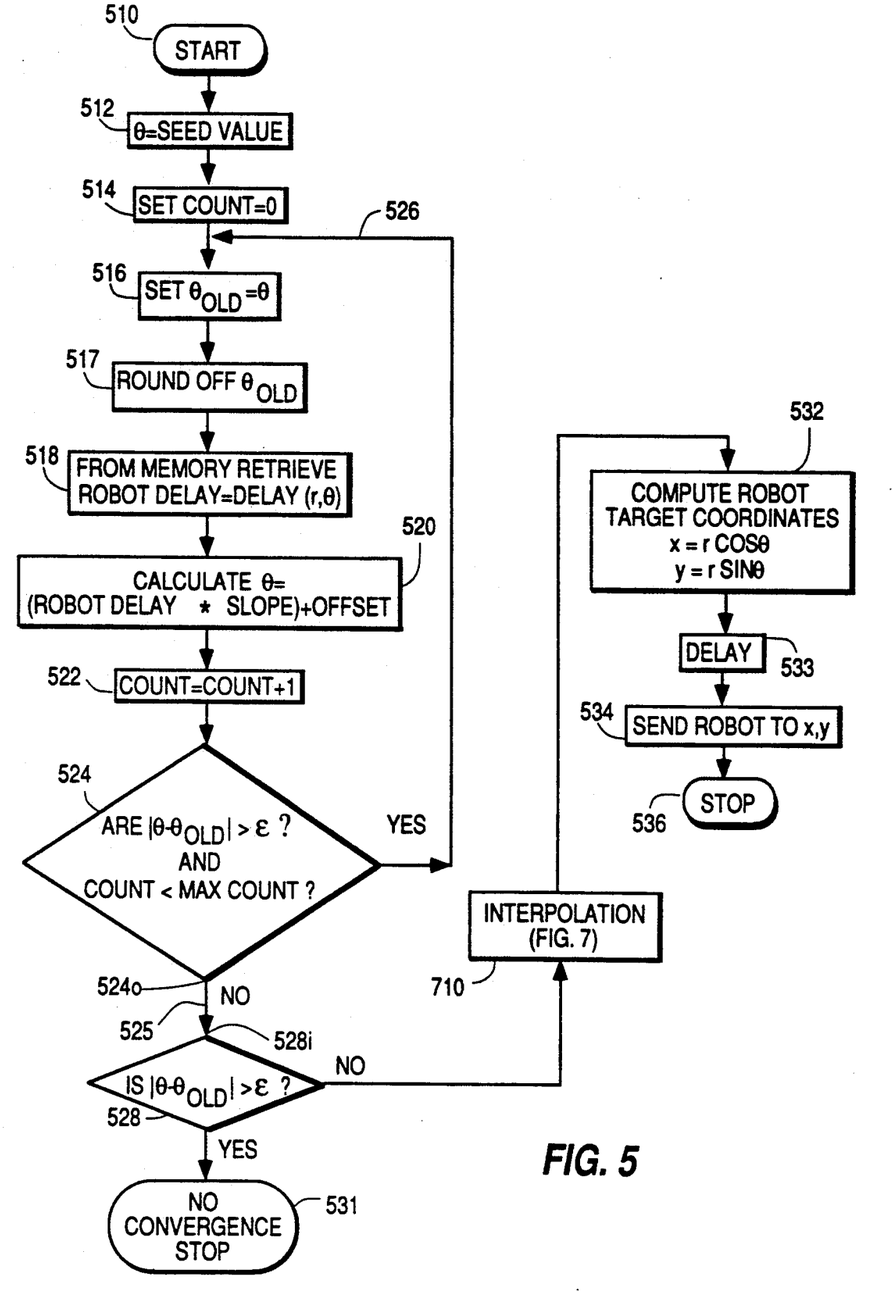
FIG. 5 is a simplified flow chart illustrating control of the robot using memorized data.

FIG. 5 is a simplified flow chart illustrating control of a robot for targeting mailpieces using stored empirical transit time information collected by a method such as that of FIG. 3. The object of the procedure is to find the intersection of a curve such as 410 (FIG. 4) with a line such as 416, and to use the information to initiate motion of the robot arm toward the target point so that it arrives at the target point concurrently with the (centroid of the) mailpiece.

In FIG. 5, the control begins with a START command 510. The logic flows to a block 512, which represents the assignment to $\theta$ of a "seed" value which may be the current $\theta$ of the mailpiece within the MAA at the time it is designated as a target. An alternative seed value is the projected future $\theta$ of the mailpiece, as described below. Block 514 represents the resetting to zero of a counter (not illustrated) which is used to prevent a continuous looping of the logic. The logic flows to a block 516, representing the assignment of the current value of $\theta$ to a variable $\theta_{old}$. Block 517 represents quantizing or rounding off the current value of $\theta$, as by dropping digits of lesser significance of the angle-representative word, to guarantee that a corresponding memory address will be located. Block 518 represents the combination of the known radius r (also suitably quantized) of the selected mailpiece on the conveyor with the currently assigned value of $\theta$ to produce the data set (r, $\theta$), and the addressing of memory with the data set to find the corresponding transit time or ROBOT DELAY.

Block 520 represents calculations using the robot delay time established in block 518, slope of $\theta$ versus time derived from knowledge of the angular speed of the conveyor, and angular offset from $\theta_{min}$ at the time the calculations are performed, to determine as the ordinate the future value of $\theta$ at which the robot can intersect the target, by use of the equation:

$$\theta = (robot\ delay \times slope) + offset$$

From block 520, the logic flows to block 522, which represents incrementing of the counter, which was set to zero in block 514, and which counts iterations of the logic loop. The number of iterations is tested, as described below, to prevent continuous looping (lock up) if convergence is not met. The logic flows from block 522 to a decision block 524, which includes the conjunction (logical AND) of two tests, namely that the difference $(\theta - \theta_{old})$ must be less than some predetermined $\epsilon$, where $\epsilon$ is a measure of the closeness of convergence, and the iteration COUNT must be less than a prescribed maximum value $COUNT_{MAX}$. The value of $\epsilon$ should have a magnitude equal to about half the difference between adjacent data points 413 (FIG. 4).

So long as $\theta - \theta_{old} > \epsilon$, i.e. convergence has not occurred, and $COUNT < COUNT_{MAX}$, i.e. the number of iterations is not large, decision block 524 directs the logic by its YES output and a loop back logic path 526 back to block 516, which begins another calculation using an updated value of $\theta$. This looping continues until either COUNT exceeds $COUNT_{MAX}$ or convergence occurs, i.e. $|\theta - \theta_{old}| < \epsilon$, at which time the logic flows from decision block 524 by its NO output to a further decision block 528, which directs the logic by a path 530 to a STOP block 531 if the magnitude or absolute value $|\theta - \theta_{old}| > \epsilon$, indicating lack of convergence after the specified maximum number of iterations, and the robot will be directed to attempt to pick up another package by other logic, not a part of the invention. If convergence has occurred, decision block 528 directs the logic by its NO output and by way of an interpolation block 710 (described below) to block 532, representing computation of the cartesian coordinates of the target location $$x = r \cos \theta$$

$$y = r \sin \theta$$

The logic then flows to a block 533, which represents a delay (which may be of zero duration) before robot motion toward the target coordinates is initiated. If the target mailpiece was in the MAA at the time it was targeted, the delay is zero, and robot arm motion is initiated immediately when the target coordinates are available. If the target is identified outside the MAA, as described in conjunction with line 414 of FIG. 4, or if it is identified at the edge of the MAA, initiation of motion is delayed. After the delay, robot motion is initiated by signals directed along a logic path 712 to a block 534, and the logic of the invention stops at a STOP block 536. Other logic, not described, controls the gripper to cause it to affix itself to the mailpiece when the robot reaches the target, and directs the arm to the dump point, at which time the mailpiece is released from the gripper, and further targeting according to the invention may be performed.

Figure 6:
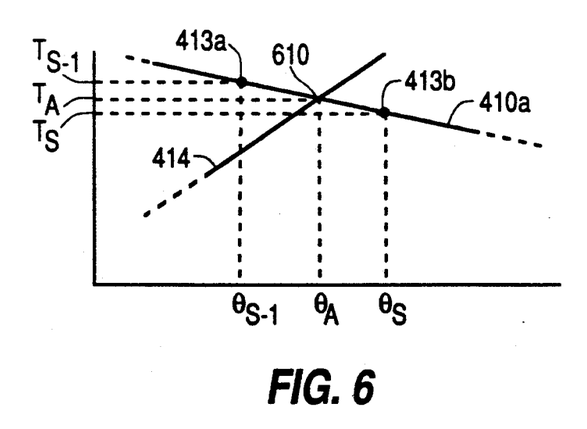
FIG. 6 illustrates two adjacent data points which are included within the data illustrated in FIG. 4.

Each time the logic of FIG. 5 loops back by way of path 526 and passes through block 517, rounding of the current value of $\theta$ takes place so that $\theta$ takes on a value which can be addressed in the transit time delay memory (not illustrated) which is addressed in block 518. The value of $\theta$ which is calculated in block 520 is modified by multiplication by a nonrounded value corresponding to the slope, and addition of a nonrounded value corresponding to the offset. When the current value of $\theta$ differs from $\theta_{old}$ by less than $\epsilon$, so that looping by path 526 ends, the current value of $\theta$ leaving decision block 528 by the NO path is therefore likely to have a value lying between data points (such as 413 of FIG. 4) for which the transit time memory can be addressed. It might require too much memory to provide transit times for every possible increment of $\theta$. Interpolation block 710 in effect constructs a straight line between two adjacent data points 413, such as data points 413a and 413b illustrated in FIG. 6, establishes the point of intersection between the locus of target locations (line 414 of FIG. 6) and the straight line, and interpolates to determine the transit time to the intersection. In FIG. 6, elements corresponding to those of FIG. 4 are designated by the same reference numeral. Dots 413a and 413b represent two adjacent data points for a particular value of r and for $\theta = \theta_{S-1}$ and $\theta_S$, respectively, and corresponding transit times stored in memory are $T_{S-1}$ and $T_S$, respectively. Line 410a is a calculated straight line extending through data points 413a and 413b. Intersection 610 of locus of target locations 414 and line 410a occurs at $\theta_A$, lying between $\theta_{S-1}$ and $\theta_S$. The interpolated transit time, $T_A$, lies between $T_{S-1}$ and $T_S$.

Figure 7:
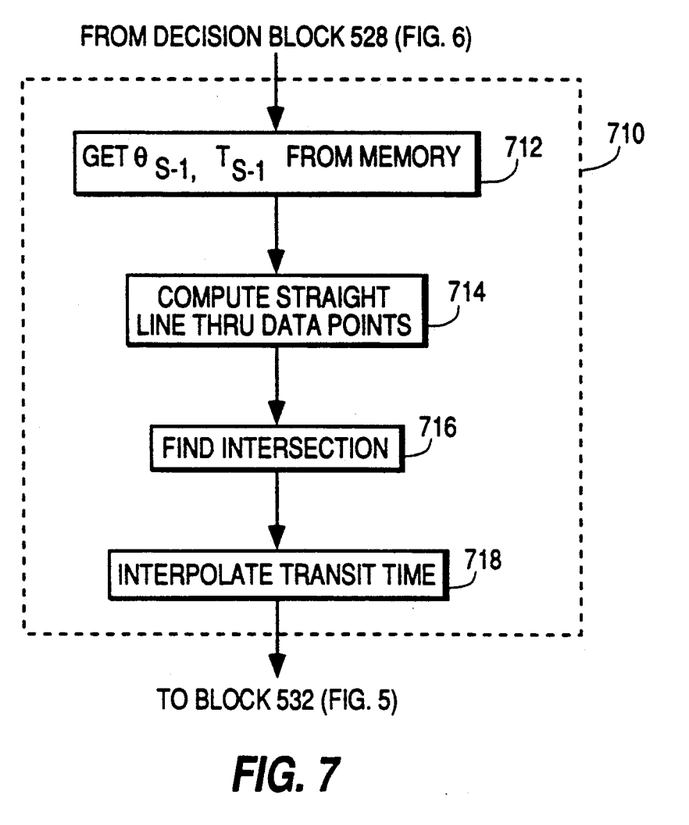
FIG. 7 is a simplified flow chart illustrating details of an interpolation associated with FIG. 5.

FIG. 7 is a flow chart representing the logic flow in block 710 of FIG. 5. In FIG. 7, the information received from decision block 528 includes target $\theta$, where $\theta$ is not rounded. Block 712 represents rounding of $\theta$ to the next higher value to determine $\theta_S$, with which the transit time memory can be addressed. Also, block 712 represents selection of the next lower value of $\theta$ for which a data point exists, namely $\theta_{S-1}$. The corresponding transit time values $T_{S-1}$ and $T_S$ are taken from memory. Block 714 calculates the straight line 410a between data the two points 413a and 413b, and block 716 finds the intersection of locus 414 with straight line 410a. Given the equation of line 410, the relative positions of $\theta_{S-1}$, $\theta_A$ and $\theta_S$, and the transit time corresponding to $\theta_{S-1}$ and $\theta_S$, a simple proportion establishes the interpolated time $T_A$, block 718.

Other embodiments of the invention will be apparent to those skilled in the art. For example, the targeted point has been described as the centroid of a mailpiece, but the targeted point could as easily be a corner or point at a predetermined distance from an edge, or even a point at a distance from an edge which is proportional to the dimensions of the object.

What is claimed is:

1. A method for causing a robot to acquire a moving article, comprising the steps of:
    measuring the speed of said article to produce a measured speed;
    at a particular time, determining the location of said article;
    calculating from said measured speed and said location of said article the position of said article at a future time;
    retrieving from among a plurality of transit times associated with a like plurality of predetermined positions, all of which transit times are stored in storage means, that transit time required for said robot to move from a rest position to a first predetermined point nearest said position of said article at a future time; and
    calculating from said future time and from said transit time to establish a time for motion of said robot to begin from said rest position toward said position of said article at a future time.

2. A method according to claim 1 further comprising the step of, at said time for motion of said robot to begin, initiating said motion of said robot from said rest position toward said position of said article at a future time.

3. A method according to claim 2 further comprising the step of causing said robot to affix itself to said article.

4. A method according to claim 3 further comprising the step of causing said robot to move said article to said rest position.

5. A method according to claim 4 further comprising the step of causing said robot to release itself from said article.

6. A method according to claim 5 wherein said step of causing said robot to release follows said step of causing said robot to move said article to said rest point.

7. A method according to claim 1 comprising an initial step of loading said storage means with said transit times required for said robot to move from said rest position to each of said predetermined positions on a grid of points of a preselected coordinate system extending over a portion of said robot's manipulation range.

8. A method according to claim 7 further comprising the step of preselecting a rectangular coordinate system.

9. A method according to claim 7 further comprising the step of preselecting a radial coordinate system.

10. A method according to claim 1 wherein said determining step includes the step of imaging a region within which said article moves to produce image signals representative of a moving article.

11. A method according to claim 10 wherein said determining step further includes the step of noting, at said particular time, the position of a point on said moving article along one dimension of a coordinate system.

12. A method according to claim 1 wherein said measuring step includes the step of monitoring the speed of article conveying means.

13. A method according to claim 1, further comprising the step of:
    if said position of said article at a future time is not precisely at one of said predetermined points, interpolating between said transit time required for said robot to move from said rest position to said first predetermined point and the transit time required for said robot to move from said rest position to a second predetermined point adjacent said first predetermined point to produce an interpolated transit time; and
    wherein said step of calculating further includes the step of calculating from said interpolated transit time.

* * * * *